US008827537B2

(12) United States Patent
Bolvi

(10) Patent No.: US 8,827,537 B2
(45) Date of Patent: Sep. 9, 2014

(54) SYSTEMS AND METHODS FOR DISTRIBUTING POWER AND DATA IN A LIGHTING SYSTEM

(75) Inventor: Ethan R. Bolvi, Dayton, OH (US)

(73) Assignee: Tourtek, Ltd., Dayton, OH (US)

(*) Notice: Subject to any disclaimer, the term of this patent is extended or adjusted under 35 U.S.C. 154(b) by 844 days.

(21) Appl. No.: 12/946,794

(22) Filed: Nov. 15, 2010

(65) Prior Publication Data

US 2011/0115402 A1 May 19, 2011

Related U.S. Application Data

(60) Provisional application No. 61/261,661, filed on Nov. 16, 2009.

(51) Int. Cl.
*H01R 25/00* (2006.01)
*H05B 37/02* (2006.01)
*B23P 6/00* (2006.01)

(52) U.S. Cl.
USPC ........... 362/648; 362/227; 362/285; 362/382; 362/391; 315/291; 315/294; 315/312; 315/318; 439/527; 439/540.1; 439/638

(58) Field of Classification Search
USPC .......... 315/291, 294, 312, 317, 318; 362/145, 362/227, 233, 285, 382, 391, 414, 418; 439/527, 540.1, 638
See application file for complete search history.

(56) References Cited

U.S. PATENT DOCUMENTS

| | | | | |
|---|---|---|---|---|
| 4,837,665 A * | 6/1989 | Hoyer et al. | ...................... | 362/96 |
| 8,344,655 B2 * | 1/2013 | Luk et al. | ...................... | 315/294 |
| 2005/0169015 A1 * | 8/2005 | Luk et al. | ...................... | 362/648 |

* cited by examiner

*Primary Examiner* — Douglas W Owens
*Assistant Examiner* — Thai Pham

(57) ABSTRACT

The described embodiments provide systems and methods for delivering power and data to lighting system. Specifically, the embodiments provide systems and methods for delivering power and data to the type of lighting system which is often used in entertainment programs and specifically live shows. Embodiments disclose various systems incorporating truss technology in conjunction with lighting, dimming, power and data distribution systems encompassing a complete and integrated mobile and rapid deployment lighting and lighting support system. Further embodiments describe truss systems used for managing cable.

14 Claims, 7 Drawing Sheets

SYSTEMS AND METHODS FOR DISTRIBUTING POWER AND DATA IN A LIGHTING SYSTEM

CLAIMS PRIORITY TO RELATED APPLICATION

This patent application claims priority to U.S. Provisional Application 61/261,661 filed on Nov. 16, 2009 and is incorporated by reference herein.

BACKGROUND OF THE INVENTION

1. Field of Invention

The present invention relates to the field of power and data distribution systems. More specifically, the present invention offers a portable, efficient solution to setting up and operating a lighting system or intelligent lighting system commonly used in a live show. Embodiments of the present invention generally relate to entertainment technology systems and in particular, to truss systems necessary to install and support entertainment systems including but not restricted to lighting, sound, video and scenic equipment in entertainment environments such as arenas, convention centers, hotel ballrooms, theatres, concert halls, stadiums and churches.

2. Description of the Related Art

The truss management system is designed to save time in the rigging of live entertainment shows ranging from the smallest of local school productions to the famous bands touring world with large and elaborate stage setups. The truss management system further addresses the issues of cable management, power and data distribution, a modular framework for distribution and a system that allows rapid adjustment to the changes different pieces of gear require regarding power and data connections.

The prior art includes plans for lighting systems as well as a variety of methods for simplifying the procedures associated with setting up and tearing down stages. This power and data distribution system is designed to improve an area of theatrical and musical touring shows that currently experiences a severe lack of efficiency. In its current format, when a show arrives at a venue an inefficient labor intensive, and time-consuming sequence of events occurs. Chain motors are hung, trusses are rigged to chain motors, rolling road cases with lighting in them are moved near the truss, lights are unpacked and secured to trusses, power cable (most commonly socapex cable) is run from one end of the truss and distributed to the lights, data cable is run from the end of the truss sequentially from light to light, and all excess cabling is coiled and taped to the truss to prevent falling while in the air.

The process requires skilled technicians at all stages including connecting and securing the trusses, rigging the entertainment technology equipment, and installing and securing the power and data cables. A fault in any of these areas such as an incorrectly tightened fastener or badly secured cable could create a potential safety hazard. Many of the entertainment truss support systems currently used in production applications are of a cumbersome and labor intensive nature, requiring the use of hand tools and skilled labor to assemble using conventional fasteners such as nuts and bolts or pins.

The inefficiency is primarily in two main areas. Much manpower is wasted to hang each individual light, move road cases as they are emptied, and then proceed to run power and data cabling. The second inefficiency is the use of long power lines, generally ranging between 50 and 150 feet, being pulled from one travel case to the needed location with the excess length being pulled from the travel case, coiled in a stack of socapex with cardboard dividers, only to be uncoiled at the end of the show and then recoiled back into their respective road cases. This same sequence applies to the data cables as well. The disclosed embodiments make the setup, tear down, and repair of these lighting systems by using power and data modules housed in boxes connected to the trusses, thus avoiding many of the above mentioned steps.

The prior art includes U.S. Pat. No. 4,837,665 to Hoyer which describes a modular stage light system. The '665 patent recognizes rampant problems associated with setting up and tearing down stage lights associated with theatrical and musical production. The '665 patent describes a system which uses trusses each with a plurality of stage lights. However, the '665 patent lacks the advantages of the present invention because the '665 patent requires complex electronics amounting to computers within each truss and lacks the flexibility of the present invention. The '665 patent offers a potential solution to the speed of tear down and set up, but can not be accomplished at such a low cost as the present invention nor can it be used as easily as the modular power and data distribution methods taught by the present invention.

A second attempt at resolving problems associated with setting up and tearing down stages with complicated lighting systems is disclosed by U.S. Pat. App. 2009/0173033A1. The '033 application teaches a folding truss system with integrated entertainment technology equipment. The '033 application lacks the flexibility of the module based power and data distribution utilized by the present invention. Further, the '033 patent application requires equipment to be permanently or semi-permanently placed in a truss. A noticeable advantage of the presently disclosed invention is that it is both portable and flexible and may be used in a variety of truss formations and may be easily transported.

Other attempts have been made to improve these systems by transporting the truss sections with their entertainment technology equipment pre-installed such as U.S. Pat. No. 4,862,336 to Richardson. These pre-installed trusses are designed so that they can drop down or otherwise fold into their operating positions. However, these trussing systems must still be assembled on site from individual separate sections of truss.

The prior art further includes U.S. Patent Application US2009/0201687A1 by Calleja for a simplified truss assembly and lighting track interconnection which discloses methods for putting necessary cables in powered truss chords. One shortcoming of the '687 application is the ability for quick and easy repair which the present invention addresses through its use of interchangeable modules which deliver power and data throughout the truss management system.

The present invention integrates all the necessary power cable, data cable, and appropriate adapters into a single unit which resides within each truss. The trusses are linked together via power and data tails at the end of each truss which continue the power and data chain down the line of truss until it has reached its destination.

One advantage present in the presently disclosed embodiment is the invention's use of modular data distribution. An intelligent light must have a way to receive data that tells it what to do as well as have a way to pass data through its wiring and out to the next light in line. The problem often encountered in these situations is that different lights require different data connectors to receive and send the necessary data. While there are a limited number of variations for this connection, any variations always lead to the need for extra gear to be placed in line to compensate for it. Often this happens by way of an adapter.

Further advantages, objects, and features of the present invention will become apparent to one of ordinary skill in the art upon consideration of the following described exemplary embodiments and corresponding drawings.

BRIEF DESCRIPTION OF SELECTED EMBODIMENTS

The present invention generally relates to a system and method for using a power and data distribution system. More specifically, the disclosed invention relates to a truss management system which distributes power and data used for live shows.

The present invention teaches a system and method of providing power and data distribution over integrated wiring through a custom modular system that offers flexibility and speed on load-in, load-out, pre-production rigging and troubleshooting or repairs when necessary. One advantage over the prior art systems is the flexibility offered by the present invention. The options for routing are numerous from the moment power or data enters the lines of the truss management system.

Socapex cables are typically used in stage lighting systems. A socapex cable normally contains nineteen wires for six complete circuits of power. Although these lines are all protected within one single jacket, the ability to split this one line out to the full six circuits it contains is possible through a piece of gear known as a breakout. A breakout goes from a male socapex connector to six individual connectors. These six individual lines are terminated to multiple power connectors for different applications. These termination types include: twist locks, stage pins, and Edison plugs. Generally a breakout has six of the same type of connector. A second adaptor is needed to go from one connector type to another connector type. This is common when one light has a different plug type on it than a previous light in the system. This also adds unnecessary length to the cable run as well as another plug in point which ultimately means another point of possible failure.

Exemplary embodiments of the present invention disclosed herein comprise two primary components with each component having multiple parts that go into making it a fully functioning unit. These two components are the main box and the module.

The truss management system herein disclosed eliminates the superfluous cabling, adapters, and risk of failure points by creating modules with different power connector termination options, but a standard connector to plug into the truss management system into the truss. As an example, one light might be plugged into a module containing an Edison plug while the light right next to it requires a twist lock. Using the embodiments of this invention disclosed herein, the first module would have an Edison plug terminating end while the second module would have a twist lock terminating end, but both modules could be plugged into the same main box. In this example, both these lights have the connections they need while still in line with each other on the same circuit.

This use of modules also allows hot swap interactivity. Using the modules described in an exemplary embodiment, when one or more lights go out the technician simply removes the current module and plugs in a module with the proper power connector without disrupting the power and data assignments to the rest of the lighting system. Using this method, the replacement can be easily made while no changes have occurred that would affect the rig, the light or even the programming.

Further embodiments of the present invention, as well as the structure and operation of these embodiments of the present invention, are described in detail below with reference to the accompanying drawings.

The truss management system utilizes a modular data distribution system. In the embodiments herein disclosed data is delivered in a manner that is substantially similar to every module. In the exemplary embodiments herein disclosed an adapter is put inline between the module and the light to give the intelligent light the connection that it needs. Starting from a data connector which may be a RJ45 connector which supports Category 5 cable on the module side allows a user to go from a RJ45 connector out to virtually any pin configuration. This advantage simplifies stocking spare parts as well as the cables going from Category 5 connectors to each of the standard data connectors used on intelligent lights takes up very little space in a technician's bag or stage box.

This innovative use of a modular data system through Category 5 cable also prepares the truss management system for the future. With this topography a user could decide to pass audio processing data from one end of the truss to the other utilizing the wiring within the main box but never coming in contact with any of the data being delivered to the lights themselves. This Category 5 topology also allows it to be utilized for proprietary communication between lights and controllers that may be necessary and often requires a completely separate wiring system. It can also allow transmission of data to LED screens and walls. And it can support the transport of communications between stage crew in various locations within a space. Due to its wiring scheme, flexibility and ability to be manipulated however necessary on an as needed basis; the truss management system provides a flexibility that currently does not exist for these products or within these industries.

The truss management system eliminates the need to troubleshoot multiple connections when a light loses power or its data connection. The connections all reside within the module and the conversion to the proper power connector occurs by simply providing the proper connection in the first place. With the truss management system, a new level of simplicity in wiring infrastructure and management is achieved.

The disclosed system and method are designed to be exemplary in nature and should not be construed as limiting the scope of the disclosed invention. The embodiments will be better understood from the following description in conjunction with the accompanying FIGS., in which like reference numerals identify like elements and in which.

DETAILED DESCRIPTION OF EXEMPLARY EMBODIMENTS

Embodiments of the disclosed invention integrate all the necessary power cable, data cable, and appropriate adapters to control a lighting system into a main box. Each main box houses power and data modules which control the lighting system. In an exemplary embodiment, the main box resides within each truss of a truss system such as those commonly used during live shows. The embodiments of the present invention residing in the trusses are linked together via power tails and data tails at the end of each main box which continue the power and data chain down the line of trusses until it has reached its destination.

Figure 1:
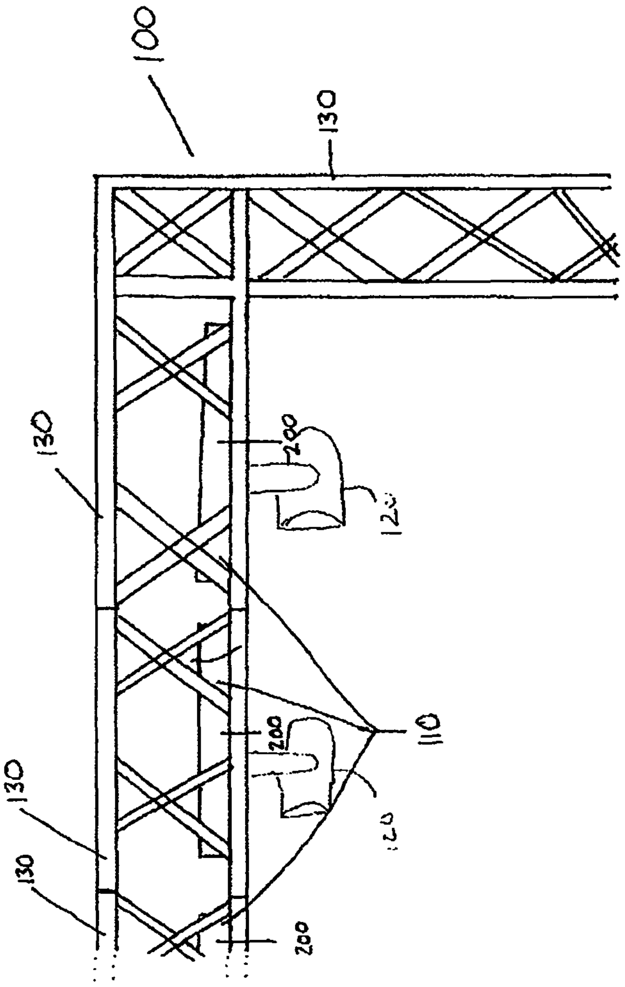
FIG. 1 is an exemplary embodiment of a truss lighting system utilizing the disclosed Truss management system.

FIG. 1 represents a stage truss system generally referred to by the numeral 100, with an embodiment of the disclosed truss management system, generally referred to by the numeral 110. An embodiment of the main box 200 is shown permanently housed within the confines of the stage truss system 100. It is understood that the stage truss system may vary in size. In the exemplary embodiment of FIG. 1, the main box 200 resides inside the truss 130. Consequently, it is anticipated that the main box 200 will vary in size just as trusses have various sizes.

While the main box may be a range of dimensions, it is anticipated that it may normally be advantageous to manufacture the main box 200 in specific dimensions which would relate to the most common dimension for a stage truss system 100.

In one embodiment of the main box 200, the main box is eight feet long. The most commonly used truss 130 is a ten foot truss. By limiting the main box 200 to a length of eight feet, a one foot allotment exists on each end that facilitates the securing of trusses 130 together via nuts and bolts. This one foot allotment is advantageous because it allows a technician to easily facilitate the mating and securing of trusses 130 together.

In another common embodiment of the main box 200, the main box is two feet long. In this embodiment, trusses 130 of odd or uncommon sizes may be fitted with the main box 200 as well. These sizes include, but are not limited to: two feet, three feet, six feet, and eight feet. This two foot main box allows each of these truss lengths to be fitted with as many two foot sections as are necessary to fill the truss or as many as are necessary to fulfill the end user's desire.

Depending on how many trusses are connected in a single run, a main box unit 200 may have data lines 220 and power lines 210 (not shown) running through it that are not utilized for that specific main box 200. Instead, the main box 200 is used as a conduit to pass those lines along to where they are needed further down the truss line. Pigtail connectors may be used at the end of each truss 130 to allow the data lines 220 (not shown) and power lines 210 (not shown) to continue down the line until they have reached the truss 130 where their circuits are supposed to be distributed.

In an exemplary embodiment, each truss has its own main box 200. It is anticipated that, a show of medium size may use thirty to fifty trusses, and would use thirty to fifty of the disclosed main boxes 200. In an exemplary embodiment, the main box 200 may have twelve module openings per truss. The module openings allow for a connection between the module 300 (not shown) and the lighting system 120 (not shown) being controlled by the module.

Figure 2A:
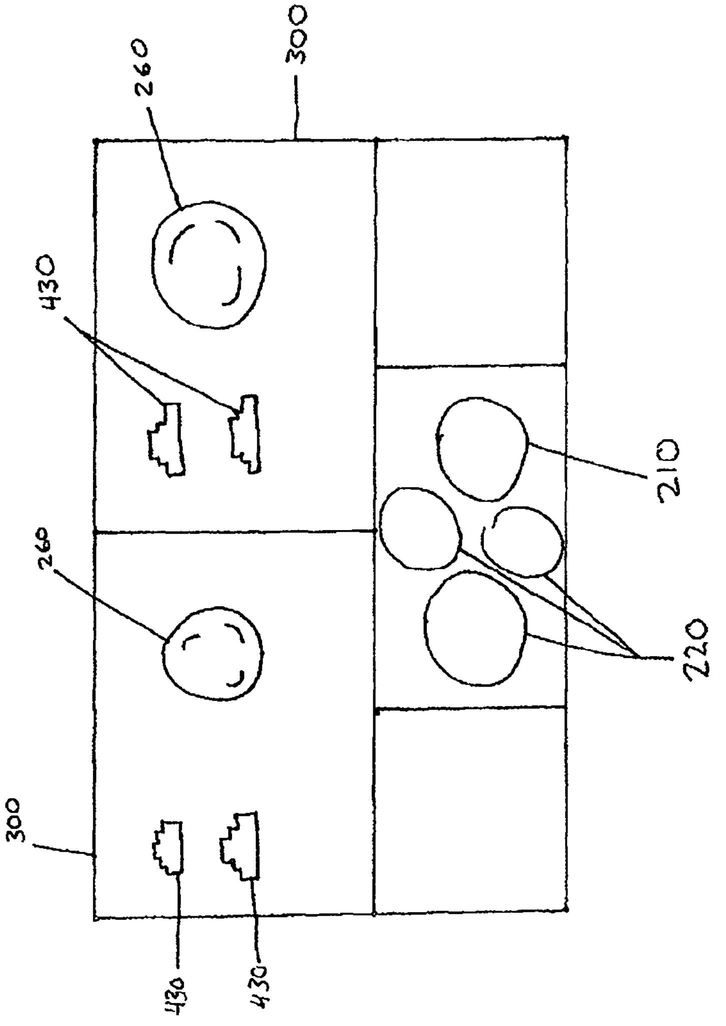
FIG. 2A is an orthogonal view of an exemplary main box.

FIG. 2A is an exemplary embodiment of the main box 200, used in the truss management system 110. A plurality of main boxes 200 being interconnected through their data tails 240 and power tails 230 make up the truss management system 110.

The main box 200 is the mating unit for the modules 300. The main box 200 is responsible for delivering power and data to one or more modules 300. The main box 200 is connected to the modules 300 via a modular connector 400. The modular connector 400 may be a simple plug between the main box 200 and the module 300. The main box 200 may also hold power wiring 210 and data wiring 220 running to the lights 120 associated with the lighting rig. In the exemplary embodiment, the main box 200 protects power wiring 210 and data wiring 220 from weather, from mishandling, and from unnecessary wear and tear that is a result of the daily packing and unpacking of cables. The main box 200 further facilitates the link between main boxes 200 in different trusses by providing power tails 230 (not shown) and data tails 240 (not shown) that may be used to connect the main box 200 housed in one truss 130 to a second main box located in a second truss.

In the exemplary embodiment of FIG. 2A, the main box 200 is comprised of 0.08 inch aluminum. However, the main box 200 may be comprised of a wide variety of materials including various metals and plastic and can vary in thickness.

In the exemplary embodiment disclosed in FIG. 2A, the main box 200 comprises two modules 300 arranged side-by-side. However, modules 300 can be arranged in a number of ways within the main box 200. Also, different numbers of modules 300 can be housed in a single main box 200.

In the exemplary embodiment the main box 200 is equipped a modular connector 400. The modular connector 400 connects the main box 200 to a module 300 to allow the main box 200 to provide the module 300 with power. The main box 200 may also provide data to the module 300 via the modular connector 400. In the exemplary embodiment, the modular connector 400 comprises a female half of a drawer connector located on the main box 200 and the male half of a drawer connector located on the module 300. A person of ordinary skill in the art will appreciate that drawer connector 400 is generally used in high-end large information technology server rooms due to its ability to offer hot-swapping. A drawer connector is advantageous in applications such as stage lighting because it typically has a larger gauge pin and socket which facilitates power distribution and a smaller gauge pin and socket which facilitates data distribution.

In the embodiment disclosed in FIG. 2A, a modular connector 400 (not shown) with an available eight power positions 410 (not shown) and twenty one data positions 420 (not shown) is selected. The truss management system 110 shown in FIG. 2A only utilizes three power positions 410 and sixteen data positions 420. The remaining positions have the capability of being used as backups in case of a broken pin or socket along with any other emergency need necessitating the use of these unused positions.

At the terminating end of the female drawer connector 400 is a custom fabricated aluminum housing which allows the data lines to be terminated to panel mounted data connectors 430. There is a data connector 430 for data in as well as one for data out. The use of a standard connector at the terminating end of the modular connector 300 allows a limitless flexibility in designating the specific data that is attached to that modular connector 400. That flexibility allows the truss management system 110 to function in a wide variety of applications.

In an exemplary embodiment, the main box 200 houses modules 300. These modules 300 contain the appropriate power connector 260 which are specific to each lighting system 120 and which connect the lighting system 120 through a power cable. Integrating this power connector 260 versus using an adapter eliminates a point of possible failure in the chain of power distribution systems common in the prior art.

Data lines 220 and power lines 210 are protected in the main box 200, and do not need to be unpacked and laid out along the truss 130 to be taped down and coiled and the repacked. Lines are protected from the environment and handling. As a result, failure in this gear will be greatly reduced. These lines experience much wear and tear from being pulled from road cases, stretched down long runs of truss, excess coiled, and then the reverse occurring as the show is being torn down.

In an exemplary embodiment, the size of the main box 200 is dependent on the size of the truss 130. For a standard ten foot truss, it is anticipated that an exemplary main box will be seven inches by 3.5 inches by two feet, six feet, eight feet, or ten feet.

As an example, the main box 200 may include internal transport for six socapex lines as well as six Category 5 lines. Generally, this equates to thirty six circuits of power and six units of DMX data for lighting fixtures, led walls, audio setups, and video servers that support DMX control. One of ordinary skill in the art will appreciate that the number of cables and circuits comprising the main box 200 may be easily modified while still obtaining many of the advantages disclosed by this embodiment.

In an exemplary embodiment, the main box 200 encloses the modules 300. In this embodiment, the main box further comprises modular openings. The modular openings allow for connection between the modules and the lighting system. In the presently described embodiment, the modular openings allow for six lines of socapex line extending from the exterior of the module 300 through the modular opening of the main box 200 and being terminated at the lighting system which the module 300 controls. Similarly, in the presently described embodiment, the modular openings allow for six lines of Category 5 cable extending from the exterior of the module 300 through the modular opening of the main box 200 and being terminated at the lighting system which the module 300 controls. The number of modular openings present on the main box 200 and type of cable which extends from the module through the modular opening will vary according to the user's requirements.

If the main box 200 does not fully enclose the modules 300, the modules 300 may be directly attached to the lighting system through one or more power connector or data connector using an appropriate cable without passing through a modular opening.

Figure 2B:
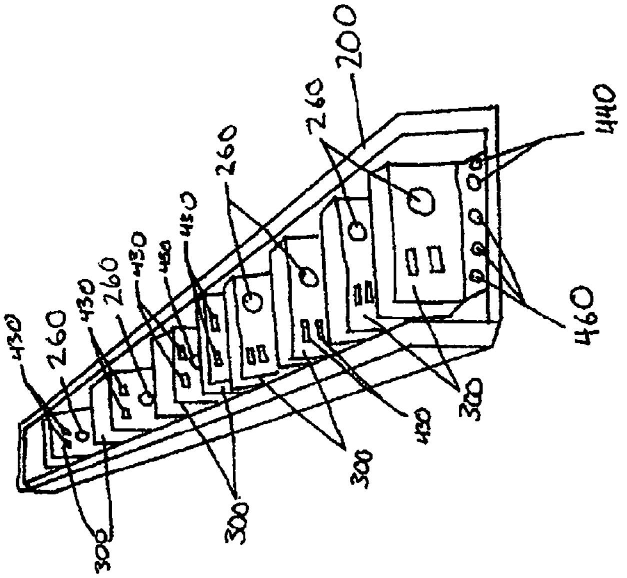
FIG. 2B is an alternative view of an exemplary main box.

FIG. 2B is an alternative view of the main box 200. FIG. 2B shows an alternative configuration for the main box 200. As can be seen in this embodiment, the main box 200 houses a plurality of modules 300. In this embodiment, said modules 300 are connected to said main box 200 through a modular connector (not visible). Data lines 220 and power lines 210 are also housed in the main box 200. Data lines 220 and power lines 210 may connect to a module 300 within the main box 200 or, if not required in the main box of FIG. 2B, may pass through the main box 200 via a power tail 230 or data tail 240 to another main box 200. FIG. 2B shows power connectors 260 and data connectors 430 which may connect to a lighting system 120 via a power cable. Although any type of cable or wire capable of transporting electrical power may be used as a power cable, it is anticipated that power connectors 260 may commonly connect to the lighting system 120 using a Socapex cable. Similarly, data cables may be any type of cable or wire capable of transporting data, but it is anticipated that data connectors 430 may commonly be RJ45 connectors and connect to a lighting system 120 using a Category 5 data cable.

Figure 3A:
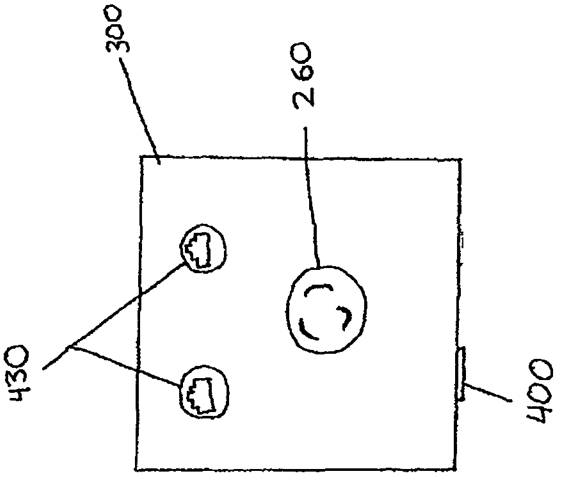
FIG. 3A is an orthogonal view of an exemplary module.
Figure 3B:
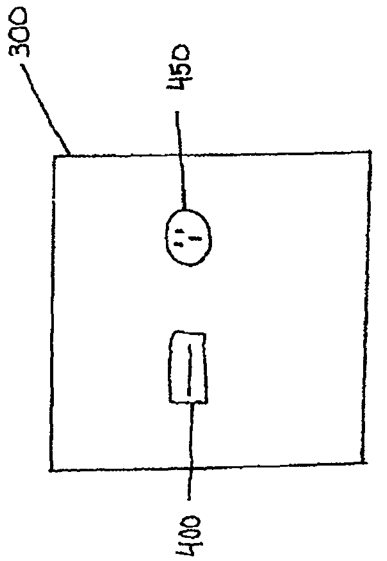
FIG. 3B is a bottom view of an exemplary module.

FIGS. 3A-3B demonstrate an exemplary representation of a module 300 used in an exemplary embodiment of the truss management system 110. The present invention integrates power and data distribution into removable modules 300. The size of the module 300 will vary depending on the size of the main box 200. It is anticipated that a common module size will be 4 inches by 4.5 inches.

In an exemplary embodiment, the module 300 receives data from the main box and uses the data in a way that is compatible with the current lighting fixture or other piece of gear being serviced at the time.

One feature of the modules 300 in an exemplary embodiment is the use of a standardized plug for data distribution. There are multiple configurations for the types of data plugs that lights are built with. In an exemplary embodiment, modules 300 attach to the main box using a standardized modular connector. However, the data connector 430, which connects to the lighting system being controlled by the module 300, may be any type of data connector 430.

The module 300 comprises modular connectors 400. The modular connector 400 is the mating connector between the module 300 and the main box 200 and may handle both power and data connectivity. In the exemplary embodiment, of FIG. 3A and FIG. 3B the modular connector 400 is a drawer connector. While not necessary, a drawer connector is advantageously used as a modular connector 400 in applications such as stage lighting because it typically has a larger gauge pin and socket which facilitates power distribution and a smaller gauge pin and socket which facilitates data distribution.

In an exemplary embodiment, the module 300 further comprises data connectors 430. In the exemplary embodiment, the module 300 comprises two data connectors 430 which support Category 5 cable. In the embodiment of FIG. 3A one data connector 430 is used for data in and the other is used for data out. The data in data connector 430 receives data from an external input source or a previous module 300 which makes up part of the truss management system 110. The data out data connector 430 sends data either to the lighting system 120 or to a subsequent module 300 making up the truss management system 110. An advantage to using a Category 5 Connector 430 is that it provides a standardized termination point from the module that may have attached a pigtail going from a Category 5 Connector 430 to any data connector required. The data connector opposite the Category 5 Connector 430 may be a three pin, four pin, five pin, or even a custom pin connection.

In the exemplary embodiment, the module 300 comprises one or more data connectors 430. Each connector will represent a different type of module 300 that can be used depending on what pin layout is required by a lighting system 120. Lighting systems may include any devices that could be controlled by the truss management system 110 including intelligent light systems, stage lights, and LED screens. Users may select modules 300 based upon the data connectors the user's application requires. Users will select modules 300 by matching the data connector 430 or power connector 260 that is required by the lighting system. In the exemplary embodiment, modules 300 are interchangeable thus making the disclosed embodiments of the present invention easily flexible.

The exemplary embodiment of FIGS. 3A-3B show a module 300 and further comprises a power connector 260. It is anticipated that the specific power connector 260 will change based on the type of connector needed for a particular lighting system as well as the power needed to operate that fixture. It is further anticipated that modules 300 may have any type of power connector 260 to match any type of lighting system, including intelligent lighting systems, light fixtures, and LED screens.

The module 300 as shown in FIGS. 3A-3B further comprise wire which connects the modular connector 400 and the power connector 260 as well as wire which may connect the modular connector 400 and the data connector 430.

The modules 300 shown in FIGS. 3A-3B may be interchangeable thus creating another advantage to a person of ordinary skill in the art. If a show has a light go out and needs to replaced, any fixture can simply and quickly be repaired by removing the current module 300 in its entirety, select a new module 300 with the proper power connector 260, insert it into the main box 200 via the modular connector 400, plug in appropriate cables in between the module 300 and the lighting system 120 via the power connector 260. This saves time, it saves money in expensive adapters, and by eliminating an adapter, a possible failure point that needs to be inspected when something goes wrong is also eliminated.

Though not necessary, the module may be made of the same grade material as the main box. In an exemplary embodiment, the module 300 is designed to fit within the main box in a recessed fashion. Once inserted in the main box, the module 300 should be flush with the surface of the main box.

FIG. 3B shows an exemplary embodiment of the bottom of a module 300. In the exemplary embodiment, there are three external connectors on the bottom of the module 300 which service the lighting fixture as well as one modular connector on any surface of the module which services the connection of the module to the main box 200.

In an exemplary embodiment, one surface of the module 300 consists of two data connectors 430. In an exemplary embodiment, one of these connectors 430 is for data coming in to the module 300. In the presently described embodiment, the data coming in to the module is passed to the lighting system 120. The other data connector 430 is for the data exiting the module 300 and being passed along to the next module 300 comprising the truss management system 100. Data connectors 430 may be of any type; however, RJ45 connectors which support Category 5 cable are typically used for these types of connections.

In some embodiments, it may be advantageous to use a ruggedized version of a standard Category 5 network cable. Using a Category 5 Cable with a rugged outer shell identical to that of a standard XLR audio cable provides protection as well as a stronger securing mechanism for mating. In an exemplary embodiment, a second RJ 45 connector is used as a data connector 430 on one surface of the module 300 is variable based on the application. Part of the unique nature of the truss management system 100 is its ability to offer customized data and power distribution based on the lighting system 120 rather than catering the lighting rig and adapters necessary to the lights themselves.

Thus, there are a vast number of module configurations available. In the exemplary embodiment of FIGS. 3A-3B, module 300 comprises two RJ45 connectors as data connectors 430, with a twist lock connector for a power connector 260. In the disclosed embodiments, any type of known data connector 430 may be used in place of an RJ45 connector and any type of power connector may be used in place of the twist lock connector.

In an exemplary embodiment, one surface of the module 300 contains the male half of a drawer connector used as a modular connector 400 which attaches to the female half of the drawer connector which is residing within the main box 200. In an exemplary embodiment, this modular connector 400 on the module allows for hot-swapping of modules 300 as it instantly connects numerous possible data lines 220 and possible power lines 210. For example, using a standard drawer connector as a modular connector 400 would allow instant connectivity of twenty one possible data lines 220 and eight possible power lines 210 to the module. The hot-swapping ability of the exemplary embodiment provides an advantage of the prior art by making set repair quicker and less expensive.

Figure 4:
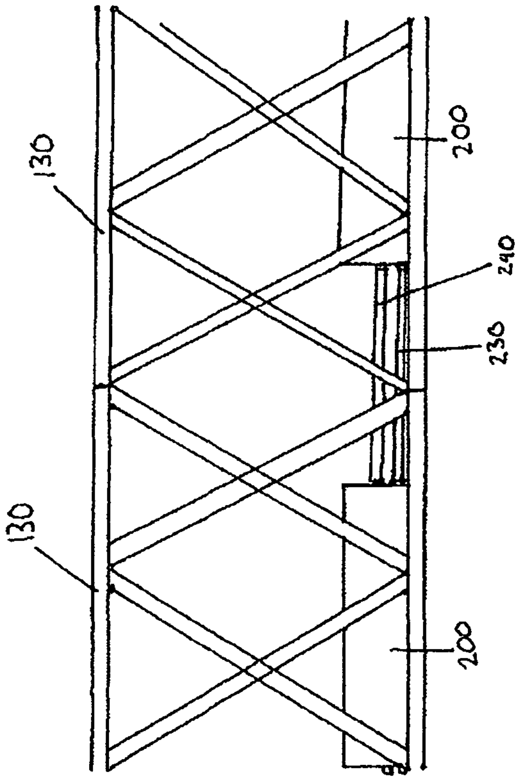
FIG. 4 is an exemplary drawing depicting the relation between multiple main boxes.

FIG. 4 is an exemplary embodiment of a Truss management system 100 showing the interconnection between two main boxes 200. As shown in FIG. 4, trusses 130 are linked together via power tails 230 and data tails 240 at the end of each truss 130 which continue the power and data chain down the line of truss until it has reached its destination. Each main box 200 has power tails and data tails on both its receiving and transmitting end and distributes power and data to the modules 300 the main box 200 houses.

The terminating ends of power lines 210 coming from the drawer connector 400 also terminate to the same housing as the data connectors 400. The power lines 210 allot a six inch lead of wire coming out of the custom housing before terminated to a custom molded male power connector. This custom power connector facilitates a flexible wiring scheme for the power distribution. This flexibility is akin to the flexibility offered in the data distribution.

The housing used to facilitate this termination also serves to protect the terminations made on the drawer connector itself, the wiring leading between the drawer connector and the data and power terminations, as well as protect the overall unit from wire breakage and failure due to the weight associated with the lines running within the main truss. These lines include: socapex 470, standard power cabling 210, Category 5 data cabling 435 among any other type of cabling a user would want to employ.

The flexibility to patch power and data wherever necessary or desirable within a lighting plot is an advantage of the truss management system herein disclosed over the prior art systems. In an exemplary embodiment, molex style plugs may be terminated on the end of every socapex cable running through the main box as well as on lead tails extending from the modular connector 400 of each module 300 opening located within the main box 200. By not having a specific circuit wired permanently to a specific module opening, there is freedom to assign circuits to module openings as desired. In an exemplary embodiment each socapex cable runs which enters into the main box 200 is long enough to meet up with the socapex cable that has entered from the other side of the main box 200.

If a circuit needs to be passed down to the next truss in line and not plugged in to any of the module openings within its own truss 130, the power lines 210 may simply attach to the main box's power tail 230 to exit the main box without being attached to or using any of the modules 300 housed within the truss 130. The power line 210 will then be available within the next truss and be available for patching into a module via the module connector 300 there or continue to be passed along until it has reached the desired truss 130 and then be plugged into an appropriate module connector 400.

This patching option extends to the data in the same way as it works for power as described above. A data line 220 can be plugged in within its own truss 130 or plugged into a data tail 240 which will take it to the next truss 130 down. This process can continue until that specific data line 220 has reached its intended truss 130 at which time it can be plugged in to the proper module connector 400.

This standardized form of data distribution, coupled with the ability to quickly and easily change out modules, allows for easy reconfiguration when new lights are added, old ones replaced, or when being prepped for a new show with different requirements. It allows the accommodation of any light with any plug configuration to be seamlessly and quickly integrated into an existing rig.

Figure 5:
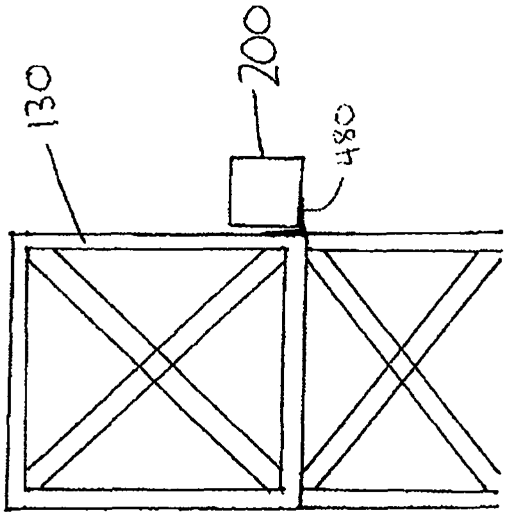
FIG. 5 is an overview of an exemplary truss management system.

FIG. 5 is an exemplary embodiment of a Truss management system 110 in which the main box 200 is not housed within a truss 130. In the exemplary embodiment, the main box 200 may be attached on the back of a truss 130 using a bracket 480. This embodiment may be useful for some truss systems which would place a light 120 or other device within the truss 130 where the main box 200 would otherwise reside. The embodiment disclosed in FIG. 5 is also useful for applications such as "truss warming" or other special effects requiring the center of the truss 130 to be empty.

In an exemplary embodiment in which the main box 200 is attached to the outside of the truss 130, the main box 200 still comprises data tails and power tails and still houses modules so the truss management system works the same way as in embodiment in which the main box 200 is housed within the truss 130.

What is claimed is:

1. A truss management system for power and data distribution related to an intelligent lighting system comprising more than one type of lights, wherein said truss management system lacks a processing unit, and wherein said intelligent lighting system comprises a plurality of main boxes, each main box comprises at least one power line, at least one power tail located on an exterior surface of said main box, at least one data tail located on an exterior surface of said main box, at least one module housed within said main box and connected to said main box by a modular connector, wherein said at least one module is interchangeable in said intelligent lighting system, wherein said at least one module is fully enclosed by said main box, wherein said main box further comprises a modular opening, wherein said data connector and said power connector are directly connected to said lighting system, and wherein said at least one module is further comprises at least one data connector, and said at least one module comprising at least one power connector, wherein said at least one module is connected to said lighting system through said power connector using a power cable, and wherein said lighting system is connected to said at least one module by a data cable through said connector.

2. The system of claim 1, wherein said main box is enclosed within a truss.

3. The system of claim 1, wherein said main box is attached on the outer surface of a truss.

4. The system of claim 1, wherein each said main box is attached to a separate truss through said data tails and said power tails.

5. The system of claim 1, wherein said module is fully enclosed by said main box, wherein said main box further comprises a modular opening, wherein said data connector and said power connector are directly connected to said lighting system.

6. The system of claim 1, wherein each said modular connector is a standardized connector.

7. The system of claim 1, wherein said intelligent lighting system comprises a stage light.

8. The system of claim 1, wherein said intelligent lighting system comprises a LED screen.

9. The system of claim 1, wherein said data connector comprises a RJ45 connector.

10. The system of claim 1, wherein said power connector comprises an Edison Plug.

11. The system of claim 1, wherein said power connector comprises a twist lock.

12. The system of claim 1, wherein said power connector is a stage pin.

13. A method of using a truss management system to repair an intelligent lighting system after a power failure, wherein said truss management system does not have a processing unit, wherein said intelligent lighting system comprises more than one type of lights, wherein said intelligent lighting system is controlled using at least one module, said at least one module being attached to a main box by a modular connector, wherein said at least one module comprises at least one power connector which connects said at least module to said intelligent lighting system using a power cable, and said power failure occurs in a first module, wherein said at least one module is interchangeable in said intelligent lighting system, wherein said at least one module is fully enclosed by said main box, wherein said main box further comprises a modular opening, wherein said data connector and said power connector are directly connected to said lighting system, the method comprising the steps of:

disconnecting a first module from said main box at the modular connector, disconnecting said first module from said lighting system at said power connector, attaching a second module to the main box using said modular connector, and connecting said second module to said lighting system at said power connector.

14. The method of claim 13, wherein said first module is further connected to said lighting system by a data connector using a data cable and further comprising the steps of disconnecting said lighting system from said first module at said data connector and attaching said second module to said lighting system by said data connector.

* * * * *